Figures 1, 2, 3:
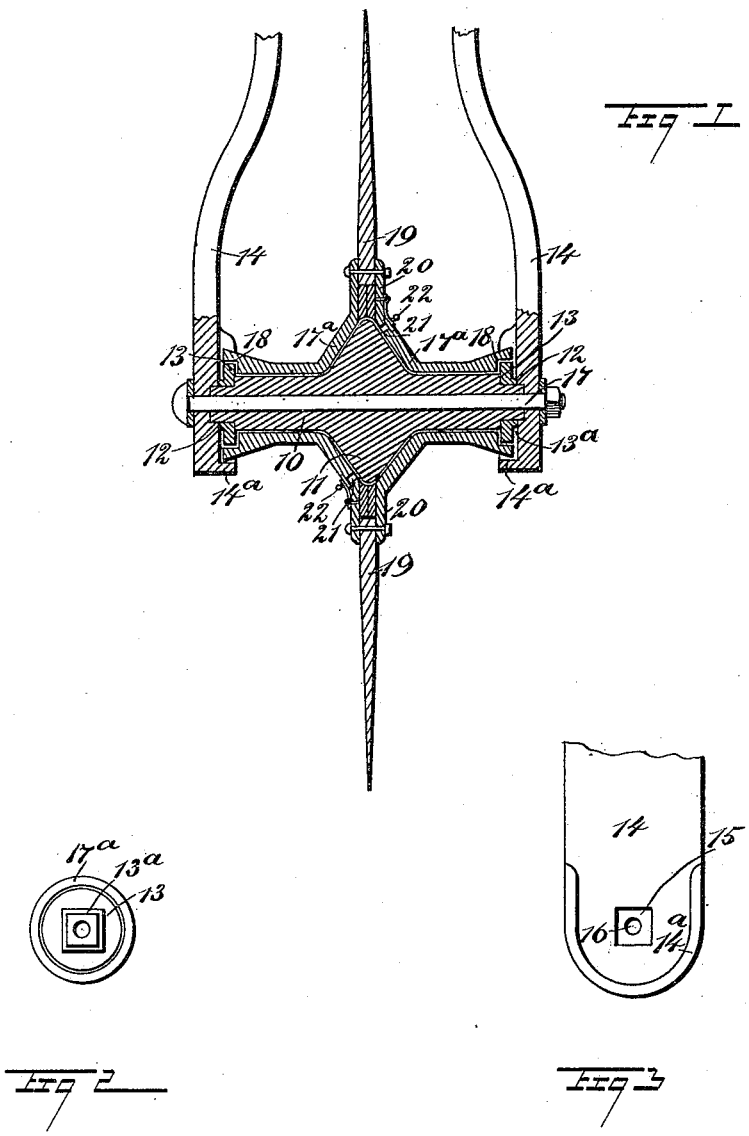

(No Model.)

H. R. HOWE.
COLTER AND WHEEL BEARING.

No. 463,899. Patented Nov. 24, 1891.

WITNESSES:
H. Walker
C. Sedgwick

INVENTOR:
H. R. Howe
BY Munn & Co.
ATTORNEYS

UNITED STATES PATENT OFFICE.

HERBERT R. HOWE, OF HOWE, NEBRASKA.

COLTER AND WHEEL BEARING.

SPECIFICATION forming part of Letters Patent No. 463,899, dated November 24, 1891.

Application filed May 19, 1891. Serial No. 393,286. (No model.)

*To all whom it may concern:*

Be it known that I, HERBERT R. HOWE, of Howe, in the county of Nemaha and State of Nebraska, have invented a new and Improved Colter and Wheel Bearing, of which the following is a full, clear, and exact description.

My invention relates to improvements in a bearing for colters and wheels which is especially adapted for colters and which is constructed in such a manner that it may be kept thoroughly lubricated and will prevent the dust from working into it.

To this end my invention consists in a bearing constructed substantially as hereinafter described and claimed.

Reference is to be had to the accompanying drawings, forming a part of this specification, in which similar figures of reference indicate corresponding parts in all the views.

Figure 1 is a broken vertical section of a colter and yoke provided with my improved bearing. Fig. 2 is a detail end view of the washer and one end of the colter-hub, and Fig. 3 is a broken inside elevation of the lower end of one of the yoke members.

The axle 10 of the colter is provided with a central conoidal enlargement 11, which serves to hold the colter in place and prevent it from wabbling, and the ends of the axle terminate in reduced projections 12, which are adapted to receive the washers 13 and to enter recesses in the lower ends of the yoke 14. The washers 13 have projecting shoulders $13^a$ on their outer sides, which are adapted to press against the inner sides of the yoke, and the yoke 14 has in its lower ends recesses 15, which are adapted to receive the reduced ends of the axle and perforations 16 in the center of the recesses, which perforations receive the ends of a bolt 17, which extends longitudinally through the center of the axle and by means of which the axle is secured to the yoke. The yoke 14 is substantially of the ordinary form, and is adapted to support the colter upon a beam, but has at its lower ends inwardly-extending curved flanges $14^a$, which serve as dust-guards and prevent the dust from getting between the hub and the yoke.

The hub $17^a$ of the colter turns upon the axle 10 and is shaped to conform with the axle, the outer ends of the hub being recessed slightly on the inner side, as shown at 18, so that they will fit nicely upon the washers 13, and it will thus be seen that the washers will exclude dust from the bearing of the colter. The hub $17^a$ is formed in two parts, which have at their inner ends flanges 20, which are firmly bolted to the colter 19.

The colter is circular in form and substantially like the ordinary colter. The hub $17^a$ is provided on opposite sides at a point opposite the enlargement 11 of the axle with perforations 21, in which oil is inserted to lubricate the bearing, and these perforations are kept closed by spring-pressed caps 22, which caps are countersunk in the hub, so that their outer surfaces will be flush with the outer surface of the hub.

The colter is suspended from a beam in the usual way, and it will be seen that it will turn easily, that it cannot wabble on account of the central enlargement of the axle, and that it will be impossible for dirt to enter between the axle and the hub.

I have described the bearing as applied to a colter; but it is obvious that it may be used upon many kinds of wheels.

Having thus described my invention, I claim as new and desire to secure by Letters Patent—

1. The combination, with the longitudinally-bored axle 10, formed in one piece, and an integral central enlargement 11, tapering in opposite directions from its center, of the hub $17^a$, formed of two parts, fitting the reduced and enlarged parts of the axle and continued beyond the center of said enlargement to form the flanges 20, having connecting-bolts.

2. The combination, with the longitudinally-bored axle 10, having reduced ends and formed in one piece, with a central enlargement 11, inclined in opposite directions from its center, of the hub $17^a$, formed in two tubular parts, flared at their inner ends to fit the inclined sides of the projection 11, flanged at 20 beyond said projection and recessed at their outer ends, as shown at 18, bolts connecting the said flanges, and washers 13 on the reduced ends of the axle within the recesses 18, the flaring portions of the hub having oil-holes and covers therefor, substantially as described.

3. The combination, with the yoke having curved flanges 14ª on its inner faces, apertures 16, and angular recesses 15, of the axle having a longitudinal bore, reduced angular ends entering said recesses 15, a hub on the axle with its ends turning within the flanges 14ª, and clamping-flanges 20 on the hub.

HERBERT R. HOWE.

Witnesses:
D. J. WOOD,
S. H. AVEY.